US006487005B2

United States Patent
Georges et al.

(10) Patent No.: US 6,487,005 B2
(45) Date of Patent: Nov. 26, 2002

(54) OPTICAL FIBER TRANSMISSION SYSTEM WITH CHROMATIC DISPERSION COMPENSATION

(75) Inventors: Thierry Georges, Perros-Guirec (FR); Daniel Le Guen, Louannec (FR); Francois Favre, Perros-Guirec (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/903,121

(22) Filed: Jul. 11, 2001

(65) Prior Publication Data

US 2001/0048546 A1 Dec. 6, 2001

(Under 37 CFR 1.47)

(51) Int. Cl.$^7$ .......................... H01S 3/00; G02F 1/295; H04B 10/12
(52) U.S. Cl. .............. 359/337.5; 359/337.4; 385/24
(58) Field of Search .......................... 359/337.4, 337.5; 385/24

(56) References Cited

U.S. PATENT DOCUMENTS

| 5,559,910 | A |   | 9/1996 | Taga et al. ................ 385/24 |
| 5,611,016 | A | * | 3/1997 | Fangmann et al. ......... 385/100 |
| 5,940,208 | A | * | 8/1999 | Blaszyk et al. ............. 359/341 |
| 6,173,588 | B1 | * | 1/2001 | Berkey et al. ............. 65/407 |
| 6,229,935 | B1 | * | 5/2001 | Jones et al. ................ 385/24 |
| 6,292,603 | B1 | * | 9/2001 | Mizuochi et al. .......... 385/24 |

FOREIGN PATENT DOCUMENTS

| EP | 0 575 881 A1 | 12/1993 | ........... H04B/10/18 |
| FR | 2 757 720 A1 | 6/1998 | ........... H04B/10/18 |
| GB | 2 299 473 A | 10/1996 | ........... H04B/10/18 |
| GB | 2299473 | * 10/1996 | |

OTHER PUBLICATIONS

Morita, I., Tanaka, K. Edagawa, N. and Suzuki, M., "40 Gbit/s single–channel soliton transmission over 10,200 km without active inline transmission control", ECOC' 98, Sep. 20–24, 1998, Post deadline paper pp. 49&51, Madrid, Spain.

Edagawa, N., Morita, I., Suzuki, M., Yamamoto, S., Tanaka, K. and Akiba, S., "Long distance soliton WDM transmission using a dispersion–flattened fiber", OFC' 97, Post deadline paper, pp. PD19–1—PD19–4, Dallas, Texas, USA.

Suzuki, M., et al., "170 Gbit/s transmission over 10,850 km using large core tranmission fiber", OFC' 98, Post deadline paper, pp. PD17–1–PD17–4, San Jose, California, USA.

Taga, H., Edagawa, N., Suzuki, M., Takeda, N., Imai, K., Yamamoto, S. and Akiba, S., "213 Gbit/s (20x10.66) over 9000km transmission experiment using dispersion–slope compensator", OFC' 98, Post deadline paper, pp. PD13–1 PD–13–4, San Jose, California, USA.

(List continued on next page.)

Primary Examiner—Nelson Moskowitz

(57) ABSTRACT

A long-distance optical transmission system comprising pulse emitter and receiver means (1, 2) and an optical line (3) which extends between said emitter and receiver means (1, 2) and which comprises alternating segments (3a, 3b) of dispersive fibers having chromatic dispersion of opposite signs, and also having a plurality of amplifiers (4), the system being characterized in that the optical line (3) comprises a plurality of pairs of dispersive fiber segments (3a, 3b) having chromatic is dispersion of opposite signs between successive amplifiers (4), and in that the cumulative dispersion C over the majority of the segments of the optical line satisfies the relationship $$(R)|C|\Delta v^2 < 0.3$$

where C is expressed in ps/nm and where $\Delta v$ is the half-height spectral value of the pulses expressed in Thz.

13 Claims, 1 Drawing Sheet

OTHER PUBLICATIONS

Murakami, M., Matsuda, T. and Imai, T., "Quarter Terabit (25x10 Gbit/s) over 9288km WDM, transmission experiment using non–linear supported RZ pulse in higher order fiber dispersion managed line", ECOC' 98, Sep. 20–24, 1998, Post deadline paper, pp. 79&81, Madrid, Spain.

Le Guen, D., O'Hare, A., Del Burgo, S., Grot, D., Favre, F. and Georges, T., "Narrow band 640 Gbit/s soliton WDM transmission over 1200km of standard fiber with 100km–21db amplifier spans", ECOC'98, Sep. 20–24, 1998, Post deadline paper, pp. 61&63, Madrid, Spain.

* cited by examiner

OPTICAL FIBER TRANSMISSION SYSTEM WITH CHROMATIC DISPERSION COMPENSATION

This application claims priority from PCT application PCT/FR00/00044, filed Jan. 11, 2000, which is based upon French national application 99/00184, filed Jan. 11, 1999.

The present invention relates to optical fiber transmission systems.

In particular, an advantageous application of the invention lies in long-distance transmission systems, and in particular in transoceanic transmission systems which need to be capable of carrying information over distances in excess of 5000 kilometers (km).

Numerous long-distance transmission systems have already been proposed which implement return to zero (RZ) modulation, i.e. modulation in the form of pulses of duration shorter than the bit time, and which comprise two segments of dispersive fiber between successive amplifiers (e.g. constituted by erbium-doped fibers) the segments having chromatic dispersion of opposite signs and compensating each other.

In such systems, local chromatic dispersion serves to reduce non-linear interaction phenomena between channels (four-wave mixing), while compensating the chromatic dispersion of the fibers makes it possible to obtain mean chromatic dispersion that is small and consequently makes it possible to minimize phenomena of pulse spreading.

The chromatic dispersion slope can be reduced in various ways and in particular either by using small-slope fibers or by using fibers having slopes of opposite signs, or by demultiplexing the channels and compensating chromatic dispersion individually in each channel.

For descriptions of optical transmission systems implementing chromatic dispersion compensation, reference can advantageously be made to the following publications:

[1] I. Morita, K. Tanaka, N. Edagawa, M. Suzuki, "40 Gbit/s single-channel soliton transmission over 10,200 km without active inline transmission control", Post-deadline paper, p. 49, ECOC'98 (Madrid);

[2] N. Edagawa, I. Morita, M. Suzuki, S. Yamamoto, K. Tanaka, S. Akiba, "Long distance soliton WDM transmission using a dispersion-flattened fiber", Post-deadline paper PD19, OFC'97 (Dallas);

[3] M. Suzuki, H. Kidorf, N. Edagawa, H. Taga, N. Takeda, K. Imai, I. Morita, S. Yamamoto, E. Shibano, T. Miyakawa, E. Nazuka, M. Ma, F. Kerfoot, R. Maybach, H. Adelmann, V. Arya, C. Chen, S. Evangelides, D. Gray, B. Pedersen, A. Puc, "170 Gbit/s transmission over 10,850 km using large core transmission fiber", Post-deadline paper PD17, OFC'98 (San Jose);

[4] N. Edagawa, M. Suzuki, N. Takeda, K. Imai, S. Yamamoto, S. Akiba, "213 Gbit/s. (20×10.66) over 9000 km transmission experiment using dispersion-slope compensator", Post-deadline paper PD13, OFC'98 (San Jose);

[5] M. Murakami, T. Matsuda, T. Imai, "Quarter Terabit (25×10 Gbit/s) over 9288 km WDM, transmission experiment using non-linear supported RZ pulse in higher order fiber dispersion managed line", Post-deadline paper, p. 79, ECOC'98 (Madrid);

[6] D. Le Guen, A. O'Hare, S. Del Burgo, D. Grot, F. Favre, T. Georges, "Narrow band 640 Gbit/s soliton WDM transmission over 1200 km of standard fiber with 100 km–21 dB amplifier spans", Post-deadline paper, p. 61, ECOC'98 (Madrid).

Nevertheless, the systems described in publications [1–5] have the drawback of not enabling high transmission rates to be achieved because of cross phase modulation phenomena between adjacent channels preventing multiplexing being sufficiently dense, i.e. a channel separation of less than 0.8 (nanometers) (nm) for 20 gigabits per second (Gbit/s) channels, of 1.8 nm for 40 Gbit/s channels, and of 0.4 nm at 10 Gbit/s (references [1] and [2]). The system of reference [6] allows multiplexing to be dense but over distances that are too short (2000 km) and limited by interaction.

To enable high data rates to be achieved over transoceanic distances, proposals have also been made for transmission systems implement soliton type modulation.

Systems of that type are described, for example, in the following publication:

M. Nakazawa et al., "16 Gbit/s WDM (20 Gbit/s×8 channels) soliton transmission over 10,000 km using inline synchronous modulation and optical filtering", PD10-1, Optical Soliton Transmission Research Group—NTT Access Network Systems Laboratories—Tokai, Ibaraki-ken 319-11 Japan.

However, the technique proposed in the above article is very difficult to implement because of the precision required (better than 0.1 picoseconds per nanometer per kilometer (ps/nm/km)) concerning the value of chromatic dispersion in each of the fiber segments.

In addition, when using fibers with non-zero chromatic dispersion slope, that technique allows transmission on certain wavelengths only.

The object of the invention is to mitigate the drawbacks of prior techniques and to propose a long-distance transmission system enabling high data rates with dense multiplexing and with a large passband.

British patent GB 2 299 473 discloses a long-distance optical transmission system comprising pulse emitter and receiver means and an optical line which extends between said emitter and receiver means and which comprises alternating segments of dispersive fibers having chromatic dispersion of opposite signs, and also a plurality of amplifiers, said optical lines including one pair of dispersive fiber segments having chromatic dispersion of opposite signs between successive amplifiers.

The invention provides a long-distance optical transmission system comprising pulse emitter and receiver means and an optical line which extends between said emitter and receiver means and which comprises alternating segments of dispersive fibers having chromatic dispersion of opposite signs, and also having a plurality of amplifiers, said optical line comprising at least one pair of dispersive fiber segments having chromatic dispersion of opposite signs between successive amplifiers, the system being characterized in that said optical line comprises a plurality of such pairs between successive amplifiers, and in that the cumulative dispersion C over the majority of the segments of the optical line satisfies the relationship.

$$|C|\Delta v^2 < 0.3$$

where C is expressed in ps/nm and where $\Delta v$ is the half-height spectral value of the pulses expressed in terahertz (THz)

In addition, the system proposed by the invention advantageously includes the various following characteristics taken singly or in any feasible combination:

the cumulative dispersion C of the segments of the optical line satisfies the relationship:

$$|C|\Delta v^2 < 0.25$$

where C is expressed in ps/nm and where Δν is expressed in THz;

the cumulative dispersion C of the segments of the optical line satisfies the relationship:

$$0.03 < |C|\Delta\nu^2$$

where C is expressed in ps/nm and where Δν is expressed in THz;

the chromatic dispersion of the segments of anomalous dispersion fiber is about 17 ps/nm/km at a wavelength of 1550 nm;

the chromatic dispersion of segments of normal dispersion fiber is about −85 ps/nm/km;

the optical line has three pairs of segments of dispersive fibers having chromatic dispersion of opposite signs, between successive amplifiers;

a segment of anomalous dispersion fiber extends over a distance of about 10 km and a segment of normal dispersion fiber extends over a distance of about 2 km;

the chromatic dispersion of the segments of normal dispersion fiber is about −17 ps/nm/km;

the optical line has two pairs of segments of dispersive fibers having chromatic dispersion of opposite signs between successive amplifiers; and a segment of fiber extends over a distance of about 10 km.

Other characteristics and advantages of the invention appear further from the following description. The description is purely illustrative and non-limiting. It should be read with reference to the accompanying figures, in which.

Figure 1:
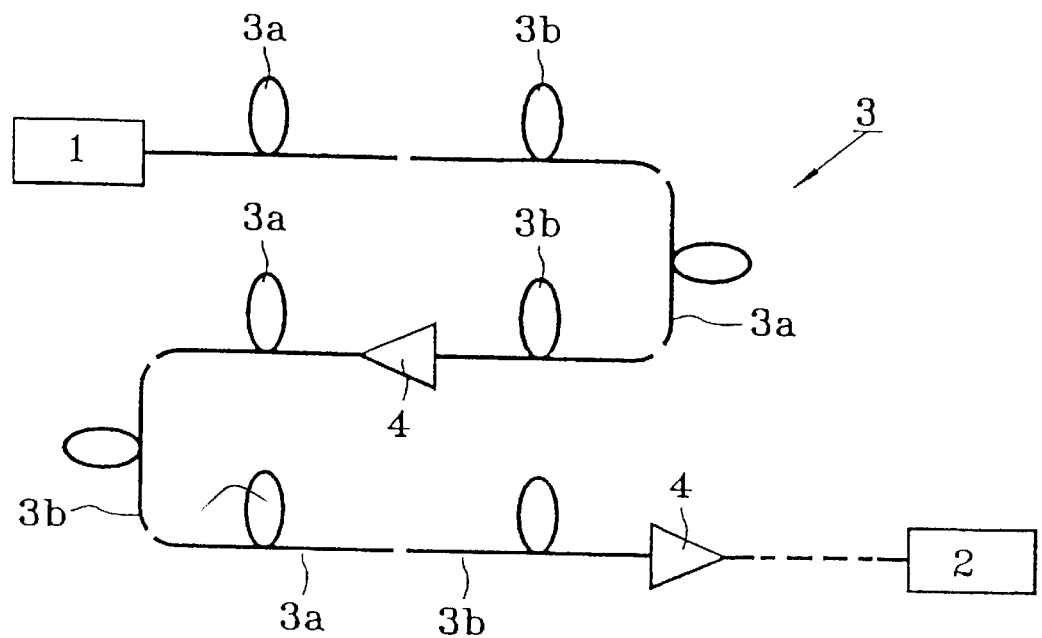
FIG. 1 is a diagram of a transmission system constituting a possible embodiment of the invention.

The system shown in FIG. 1 has emitter means 1, receiver means 2, and an optical transmission line 3 which extends between said emitter and receiver means 1 and 2.

The emitter means 1 generate an optical signal constituted by a succession of RZ pulses. The receiver means demodulate the signal after it has been transmitted by the line 3.

This optical transmission line 3 includes a plurality of amplifiers 4 which are regularly distributed along its length.

Between successive amplifiers 4, the line has a plurality of fiber segments 3a of anomalous dispersion alternating with fiber segments 3b of normal dispersion.

These fiber segments 3a and 3b are such that for the majority of them (at least 90%), their cumulative dispersion C satisfies the relationship:

$$(R) |C|\Delta\nu^2 < 0.3$$

where Δν is the half-height spectral width of the pulses (expressed in THz) and where C is the cumulative dispersion expressed in ps/nm.

This condition makes it possible to minimize interactions between pulses.

Preferably, the cumulative dispersion satisfies:

$$|C|\Delta\nu^2 < 0.25$$

Thus, for a channel data rate of 20 Gbit/s, the cumulative dispersion is advantageously less than 150 ps/nm; for a channel data rate of 40 Gbit/s, the cumulative dispersion is advantageously less than 30 ps/nm.

Furthermore, the cumulative dispersion of the fiber segments also advantageously satisfies the relationship:

$$0.03 < |C|\Delta\nu^2$$

This condition makes it possible to reduce four-wave mixing and to reduce interaction between successive pulses.

Furthermore, by increasing the number of pairs of fiber segments 3a, 3b between successive amplifiers 4 it is possible to use fibers that are highly dispersive while remaining within a domain in which cumulative dispersion is small enough to minimize interactions between pulses. The anomalous fiber segments are advantageously selected to have chromatic dispersion greater than 8 ps/nm/km while the normal fiber segments are selected to have chromatic dispersion whose absolute value is greater than 8 ps/nm/km.

Figure 2:
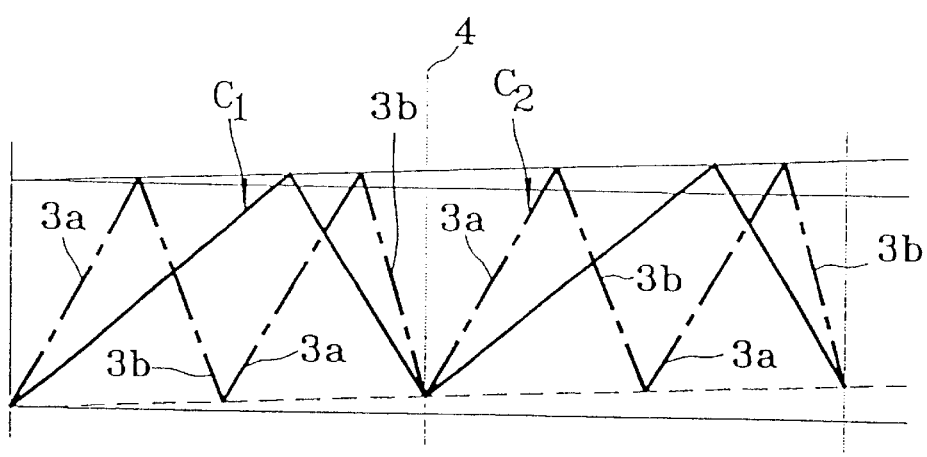
FIG. 2 is a graph plotting maps of cumulative dispersion in a prior art transmission system and in a transmission system constituting a possible embodiment of the invention.

As an illustration, FIG. 2 is a map of the cumulative dispersion $C_1(z)$ (where z is distance) in a transmission system satisfying relationship R and having a single pair of fiber segments between successive amplifiers 4. FIG. 2 also shows a map of cumulative dispersion $C_2(z)$ (with local chromatic dispersion $D_1(z)$ being given by the slope of $C_1(z)$) in a system, which for the same spacing between amplifiers 4 has two pairs of fiber segments between amplifiers, said transmission map satisfying $C_2(z)=2C_1(z/2)$ The second dispersion map makes it possible to use narrower pulses which interact less and which have smaller cross phase modulation effects than when using the first dispersion map.

This can be generalized to the case of a transmission map satisfying $C_n(z)=nC_1(z/n)$ and corresponding to a transmission system having n times as many dispersive segments between successive amplifiers (where n is an integer).

In FIG. 2, cumulative dispersion (in ps/nm) is represented by the dashed-line curves.

The anomalous fiber segments 3a are advantageously constituted by single-mode fibers (SMF) of the kind used in standard manner in telecommunications.

SMF fibers are very dispersive.

They also present a large effective mode area—thus reducing non-linearity—low losses and small chromatic dispersion slopes.

The normal fiber segments 3b are advantageously chromatic dispersion compensating fibers—referred to by the person skilled in the art as dispersion compensating fibers (DCF)—or reverse dispersion fibers (RDF), in which chromatic dispersion is substantially opposite to that of SMF fibers.

The distance between successive amplifiers 4 preferably lies in the range 35 km to 60 km.

The power level output by the amplifiers 4 is selected to be sufficient to enable a satisfactory signal-to-noise ratio to be achieved with low jitter.

The characteristics of the means 1 which constitute the emitter source (spectrum width, dispersive elements at line inlet, etc.) are defined by the chromatic dispersion map of the transmission line 3 and by the inline power of each channel. They are selected to obtain an operating point that is stable, enabling small variations in spectrum width to be accommodated during propagation.

The dispersion at the input to the receiver means 2 is optimized so as to minimize jitter and so as to re-time the signal.

To reduce the effects of cross phase modulation a little more:

1) guiding filtering can be used; and
2) overmodulation of chromatic dispersion having periodicity greater than the distance between amplifiers can be added: this is obtained by modifying the respective lengths of the dispersive segments.

A system of the type described above can be used to transmit a multiplex of N×20 Gbit/s (where N is an integer greater than or equal to 1, and can be as great as 40 or even more) over a transoceanic distance (>5000 km), together with line fibers constituted by standard fiber (SMF) which presents anomalous chromatic dispersion of about 17 ps/nm/km at a wavelength of 1550 nm, and a chromatic dispersion compensating fiber (DCF) which presents normal chromatic dispersion of about −85 ps/nm/km. Between successive amplifiers 4, the transmission line 3 is made up of three SMF type fiber segments 3a each having a length equal to 8 km and three DCF type fiber segments 3b alternating between the SMF segments and each presenting a length of 1.59 km, which corresponds to a distance between successive amplifiers that is approximately equal to 29 km.

The mean chromatic dispersion is anomalous (slightly less than 0.1 ps/nm/km). The power of the line amplifiers is −1.5 decibels relative to 1 milliwatt (mW) per channel (dBm/channel) which amounts to 10.5 dBm for 16 channels). Pulse duration is about 12 ps. The initial chromatic dispersion (typically −70 ps/nm) is optimized to obtain propagation that is stable. The high chromatic dispersion value makes it possible for channels to be spaced apart by 0.8 nm, or even by 0.6 nm.

The segments 3b are advantageously made using DCF type fibers having a chromatic dispersion slope of about −0.26 ps/nm²/km. The chromatic dispersion slope of SMF fibers—which is about 0.053 ps/nm²/km—is then completely compensated. The transmission wavelength bandwidth is then limited only by the flatness of the amplifiers and can therefore exceed 25 nm.

In a variant, it is possible to use SMF fiber segments having chromatic dispersion of about 17 ps/nm/km at a wavelength of 1550 nm and RDF fiber segments having chromatic dispersion of opposite signs, i.e. chromatic dispersion of about −17 ps/nm/km. Between successive amplifiers 4, the transmission line 3 is constituted by two SMF type fiber segments 3a each presenting a length of 8 km and two RDF type fiber segments 3b alternating with the SMF segments and each presenting a length of 7.9 km, thus corresponding to a distance between successive amplifiers of approximately 32 km.

The mean chromatic dispersion is slightly less than 0.1 ps/nm/km. The power of the line amplifiers is 2 dBm/channel (i.e. 10 dBm for 16 channels). Pulse duration is about 13 ps. Channel spacing can be 0.8 nm or even 0.6 nm because of the high value of the chromatic dispersion. Furthermore, the RDF segments have a chromatic dispersion slope of about −0.05 ps/nm²/km which completely compensates the chromatic dispersion slope of the SMF segment (0.053 ps/nm²/km). The total bandwidth is thus limited by the flatness of the amplifiers and can therefore exceed 25 nm.

A total data rate in excess of 40×20 Gbit/s can be transmitted over a transoceanic distance.

What is claimed is:

1. A long-distance optical transmission system comprising pulse emitter and receiver means and an optical line which extends between said emitter and receiver means and which comprises alternating segments of dispersive fibers having chromatic dispersion of opposite signs, and also having a plurality of amplifiers, said optical line comprising at least one pair of dispersive fiber segments having chromatic dispersion of opposite signs between successive amplifiers, the system being characterized in that said optical line comprises a plurality of such pairs between successive amplifiers, and in that the cumulative dispersion C over the majority of the segments of the optical line satisfies the relationship $$|C|\Delta v^2 < 0.3$$

where C is expressed in ps/nm and where $\Delta v$ is the half-height spectral value of the pulses expressed in THz.

2. A system according to claim 1, characterized in that the cumulative dispersion C of the segments of the optical line satisfies the relationship:

$$|C|\Delta v^2 < 0.25$$

where C is expressed in ps/nm and where $\Delta v$ is expressed in THz.

3. A system according to claim 1, characterized in that the cumulative dispersion C of the segments of the optical line satisfies the relationship:

$$0.3 < |C|\Delta v^2$$

where C is expressed in ps/nm and where $\Delta v$ is expressed in THz.

4. A system according to claim 3, characterized in that the chromatic dispersion of the segments of anomalous dispersion fiber is about 17 ps/nm/km at a wavelength of 1550 nm.

5. A system according to claim 4, characterized in that the chromatic dispersion of segments of normal dispersion fiber is about −85 ps/nm/km.

6. A system according to claim 5, characterized in that the optical line has three pairs of segments of dispersive fibers having chromatic dispersion of opposite signs, between successive amplifiers.

7. A system according to claim 6, characterized in that a segment of anomalous dispersion fiber extends over a distance of about 10 km and a segment of normal dispersion fiber extends over a distance of about 2 km.

8. A system according to claim 4, characterized in that the chromatic dispersion of the segments of normal dispersion fiber is about −17 ps/nm/km.

9. A system according to claim 8, characterized in that the optical line has two pairs of segments of dispersive fibers having chromatic dispersion of opposite signs between successive amplifiers.

10. A system according to claim 9, characterized in that a segment of fiber extends over a distance of about 10 km.

11. A system according to claim 9, characterized in that it includes guiding filtering means.

12. A system according to claim 1, characterized in that the respective lengths of the dispersive segments are selected so as to enable overmodulation of the chromatic dispersion.

13. A system according to claim 2, characterized in that the cumulative dispersion C of the segments of the optical line satisfies the relationship:

$$0.3 < |C|\Delta v^2$$

where C is expressed in ps/nm and where $\Delta v$ is expressed in THz.

* * * * *